United States Patent [19]
Hopson

[11] Patent Number: 5,471,780
[45] Date of Patent: Dec. 5, 1995

[54] FISHING LURE WITH RECHARGEABLE CONTAINER FOR AN ATTRACTANT

[76] Inventor: Lee E. Hopson, 82927 Howe La., Creswell, Oreg. 97426

[21] Appl. No.: 262,481

[22] Filed: Jun. 20, 1994

[51] Int. Cl.[6] .................................... A01K 85/00
[52] U.S. Cl. .......................................... 43/42.06
[58] Field of Search ................... 43/42.06, 42.09

[56] References Cited

U.S. PATENT DOCUMENTS

| | | | |
|---|---|---|---|
| 1,993,990 | 3/1935 | Catarau | 43/46 |
| 2,674,058 | 4/1954 | Lindenberg | 43/42 |
| 3,108,389 | 10/1963 | McGuire | 43/42.06 |
| 3,987,575 | 10/1976 | Morita | 43/42 |
| 3,991,504 | 11/1976 | Pieper | 43/42.06 |
| 4,047,317 | 9/1977 | Pfister | 43/42 |
| 4,520,588 | 6/1985 | Hindermyer | 43/42 |
| 4,610,103 | 9/1986 | Steinman | 43/17 |
| 4,888,907 | 12/1989 | Gibbs | 43/42.06 |
| 4,953,319 | 9/1990 | Kasper | 43/42.06 |
| 5,018,297 | 5/1991 | Kennedy | 43/42.06 |
| 5,142,811 | 9/1992 | Freeman | 43/42.06 |
| 5,172,510 | 12/1992 | Lovell | 43/42.06 |
| 5,321,906 | 6/1994 | Bommarito | 43/42.06 |

*Primary Examiner*—Kurt Rowan
*Attorney, Agent, or Firm*—James D. Givnan, Jr.

[57] ABSTRACT

A fishing lure has a chamber into which is inserted an elongate container for the reception of a fish attractant. The container has a series of openings which receive fish attractant injected into vents or passageways in the lure main body from a storage container of the squeeze bottle type fitted with a tapered nozzle allowing vent insertion. For removal of the elongate container from the lure, a projection protrudes from the rearward end of the container to receive a fingertip. A tang on the container seats in a recess of the lure body to hold the container in place until momentary flexing of the container by fingertip pressure dislodges the tang.

1 Claim, 1 Drawing Sheet

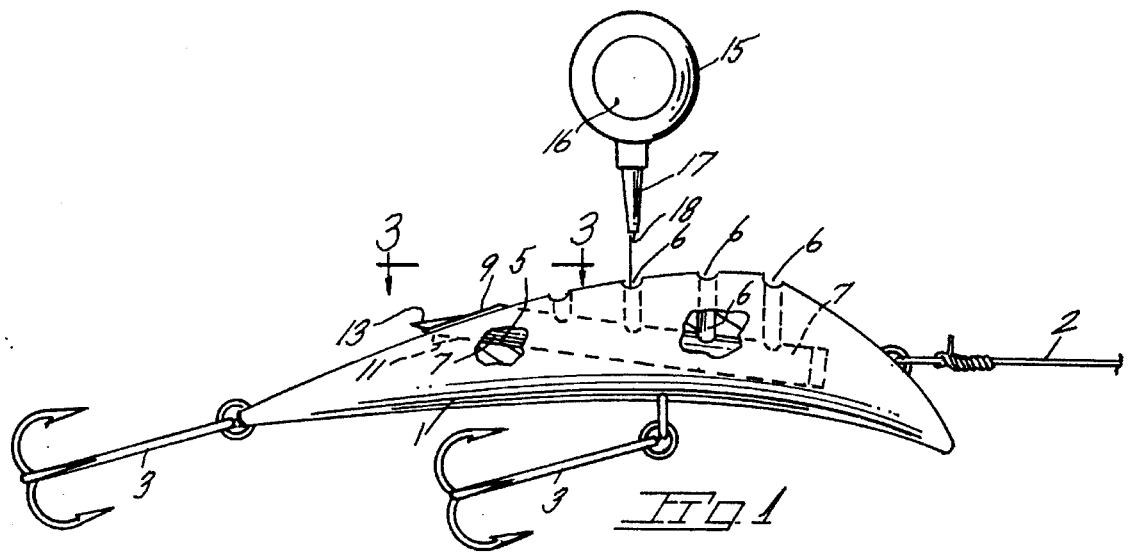
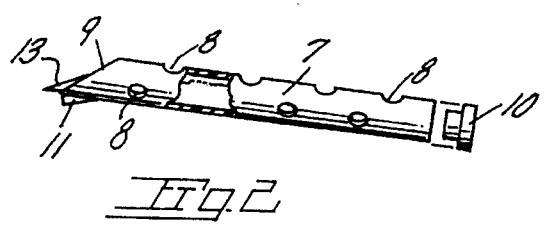
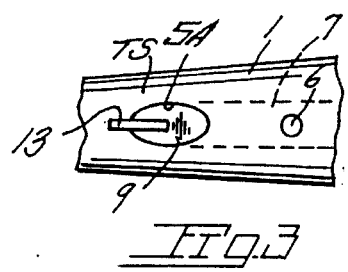
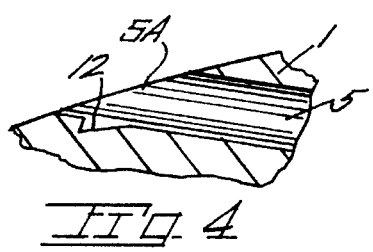

FISHING LURE WITH RECHARGEABLE CONTAINER FOR AN ATTRACTANT

BACKGROUND OF THE INVENTION

The present invention pertains generally to fishing lures of the type that may be provided with an attractant to increase lure effectiveness.

The application of a fish attractant to a lure is well known. In prior art lures it is disclosed that various attractants may be applied to lures with some equipped to retain the attractant during use.

U.S. Pat. No. 4,610,103 discloses a lure having a capsule inserted therein in frictional engagement with the lure body yet removable therefrom to receive a chemical for lure illumination. The capsule is of imperforate construction. U.S. Pat. No. 4,520,588 discloses a fishing lure rendered luminescent by reason of a chemical light stick housed within an enclosure of the lure. U.S. Pat. No. 4,047,317 discloses a lure formed in halves which may swing relative one another to receive and enclose scented material. U.S. Pat. No. 3,987,575 discloses a lure having a chamber in which a capsule is housed charged with a liquid attractant to dispense same during lure use. U.S. Pat. No. 2,674,058 discloses a lure having a tubular cartridge insertable for frictional fit within a socket formed in the lure body. A tubular needle punctures the cartridge upon cartridge insertion to meter discharge of an attractant during lure use. U.S. Pat. No. 1,993,990 discloses a lure body having a cavity therein and an enclosure movably mounted upon the lure to enclose an attractant deposited in the cavity with openings in the closure for emitting attracting discharge.

SUMMARY OF THE PRESENT INVENTION

The present lure includes a tubular container for reception of a fish attractant with means provided for periodically charging the container with the attractant.

The lure body defines an elongate chamber with vents through which may pass a fish attractant during charging of the lure as well as during lure use. Also during lure use the same may be retrieved and a new container of attractant may be substituted with the same or different attractant. The lure may receive supplemental or different attractant without removal of the container from the lure body by the injection of an attractant through an opening or vent in communication with the chamber housing the container. The container is of elongate perforate configuration having a series of openings therein through which an attractant may be injected and through which the attractant may escape during lure use. One end of the container includes an extension to facilitate removal of the container from the lure body simply by fingertip pressure. Periodic charging of the lure with an attractant is conveniently achieved through the provision of a container of flexible construction having a small orifice permitting insertion of same into a vent in the lure. The present arrangement permits a fisherman to rapidly treat the lure with various attractants to minimize the time the lure is out of the water. Additonally provision is made to facilitate removal of an attractant container to enable convenient changing from one attractant container to another in an attempt to find the optimum attractant.

Important objectives of the present invention include a fish lure having a chamber formed therein and a series of vents communicating therewith for the passage of a fish attractant; the provision of a fishing lure utilizing a container for an attractant having a nozzle with an orifice shaped to permit injection of a fish attractant into a lure vent for charging of the lure; the provision of an attractant container shaped to cooperate with surfaces of the lure body to retain the same against accidental separation yet permit convenient removal of the container; the provision of a fishing lure for use in conjunction with a collapsible container for a fish attractant and having a flexible wall component enabling discharge of the attractant in a forceable manner through a nozzle orifice of the container into a vent in the lure body for recharging of the lure with an attractant.

BRIEF DESCRIPTION OF THE DRAWINGS

In the accompanying drawings:

FIG. 1 is a side elevational view of a fishing lure embodying the present invention with an attractant container relocated out of engagement with the lure body;

FIG. 2 is a side elevational view of an attractant container apart from the lure body;

FIG. 3 is a horizontal fragmentary view of the lure body taken along line 3—3 of FIG. 1; and FIG. 4 is a fragmentary sectional view of the lure body and particularly the rearward portion of which houses the trailing end of the container shown in FIG. 2.

DETAILED DESCRIPTION OF THE PREFERRED EMBODIMENTS

With continuing attention to the drawings wherein applied reference numerals indicate parts similarly hereinafter identified, the reference numeral 1 indicates the body of the present lure with a leader 2 attached to the body equipped with hooks 3.

Lure body 1 defines an elongate chamber 5 having an opening 5A in trailing surface TS of the lure. Vents at 6 in the body extend inwardly into communication with chamber 5 and serve to admit a fish attractant, as later explained, and permit discharge of a fish attractant.

An elongate attractant container at 7 is of perforate construction having openings 8 formed therealong. Container 7 is formed of a pliable synthetic plastic to permit slight deformation of the container during separation of same from the lure. A cap is at 10 while a closed end is at 9. With regard to the trailing end of container 7, the same is quipped with a tang 11 which seats within a recess 12, shown in FIG. 4, formed adjacent the trailing surface of body 1. Also on container 7 is a projection 13 which projects beyond the trailing surface of TS on lure body 1 to enable application of fingertip applied force to flex elongate container 7 to the extent tang 11 may be lifted from recess 12 whereafter container 7 may be withdrawn from chamber 5.

A storage receptacle at 15 serves to provide a source of fish attractant to enable periodic servicing of the lure and includes a flexible wall member as at 16 to enable pressurized discharge of attractant through nozzle 17 preferably of conical shape with an outlet orifice 18 of a size permitting insertion of the nozzle end into a vent 6 during charging of the lure with attractant. Attractant receptacle 15 is preferably of a size to permit a number of such receptacles to be carried in a tackle box, each provided with a different attractant to permit the fisherman to experiment with attractants to find the most effective. Application of attractant to the lure is by discharge through inserted nozzle 17 into the lure body with attractant flowing through a vent 6 into an opening or openings 8 in container 7.

Cap 10 permits optional filling of elongate container 7 upon container removal from the lure. During lure use, water will enter into chamber 5 to dissolve the attractant for subsequent passage outwardly through a vent 6.

If so desired container 7 may be removed from the lure and solids inserted into the open end of the container prior to replacement of cap 10 and container 7 into the lure body, whereafter water passing inwardly and outwardly through vent 6 will dissolve and disperse the attractant. An optional method of using the present lure includes the charging of chamber 5 with a solid attractant. In this instance the attractant is dispersed addtionally through the opening in trailing surface TS of the body indicated at 14. In the preferred use nozzle 17 of receptacle 15 is seated in one or more of the vents 6 to inject the attractant into a vent and into container 7 via an opening 8.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A fishing lure comprising, a main body having an internal wall defining an elongate chamber therein open at one of its ends, a vent in said main body terminating in said intermediate said ends chamber, said internal wall having a recess therein adjacent said one of said ends; and an elongate container of pliable construction for a fish attractant insertable into said chamber, projecting laterally from said container and insertable into said recess to prevent accidental dislodgement of the container during lure use, said elongate container including an end wall; an extension protruding rearwardly from the end wall and displaceable by a fingertip to remove said tang from said recess to permit removal of the container from the main body.

\* \* \* \* \*